(No Model.) 2 Sheets—Sheet 1.
C. C. ADELSPERGER.
SHIFTING SEAT.

No. 385,831. Patented July 10, 1888.

Witnesses.
Joshua Scott.
W. I. Grove

Inventor.
Charles C. Adelsperger.
By Paul A. Staley
Atty (No Model.) 2 Sheets—Sheet 2.
C. C. ADELSPERGER.
SHIFTING SEAT.
No. 385,831. Patented July 10, 1888.
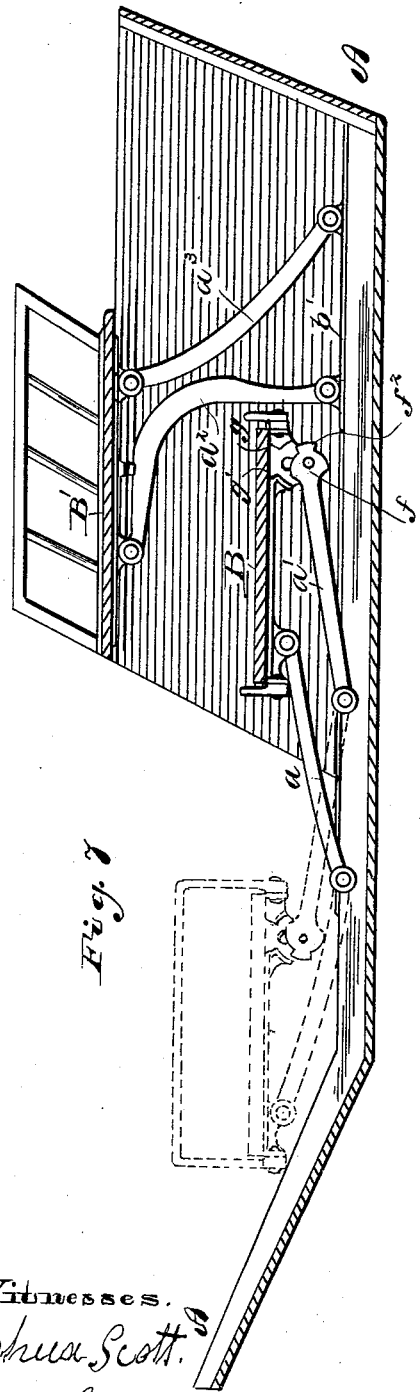
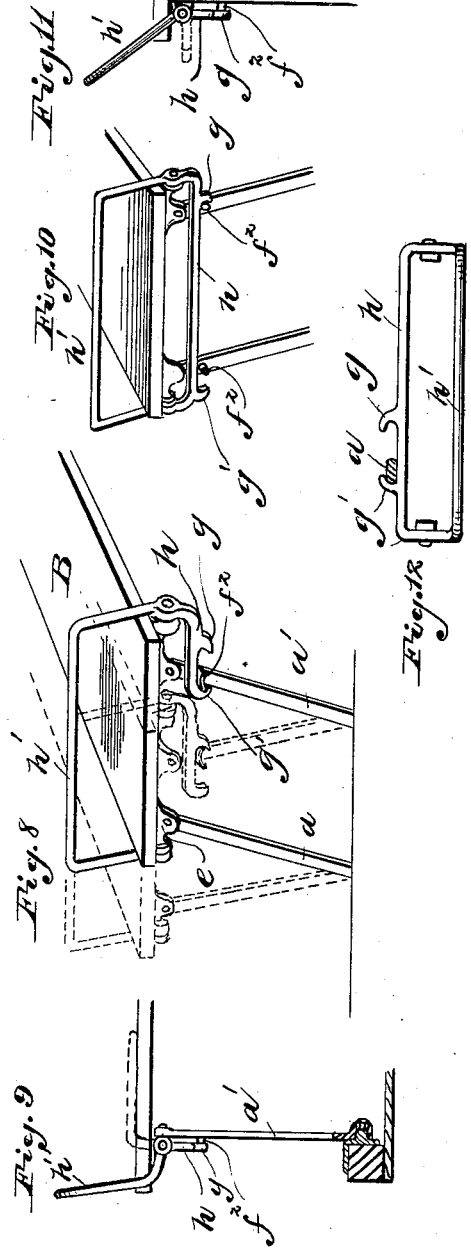
Witnesses.
Joshua Scott
W. I. Grove
Inventor.
Charles C. Adelsperger.
By Paul A. Staley
Atty.

UNITED STATES PATENT OFFICE.

CHARLES C. ADELSPERGER, OF SPRINGFIELD, OHIO, ASSIGNOR TO CHARLES L. BOGLE, OF SAME PLACE.

SHIFTING SEAT.

SPECIFICATION forming part of Letters Patent No. 385,831, dated July 10, 1888.

Application filed November 25, 1887. Serial No. 256,155. (No model.)

*To all whom it may concern:*

Be it known that I, CHARLES C. ADELSPERGER, a citizen of the United States, residing at Springfield, in the county of Clark and State of Ohio, have invented certain new and useful Improvements in Shifting Seats for Vehicles, of which the following is a specification.

My invention relates to improvements in shifting seats for vehicles, and it particularly relates to that class of shifting seats described and shown in my prior patents, No. 340,970, dated May 4, 1886, and No. 367,844, dated August 9, 1887.

The objects of my invention are, first, to provide means which will permit a limited movement of the front seat backward or forward when turned into position for use, which movement is independent of the folding motion of said seat by which the vehicle is converted from one to two seated, or vice versa.

The further object of my invention is to provide a novel means for locking the seat in a position for use, which means shall also permit of a backward or forward movement of said seat.

The further object of my invention is to provide for adjusting the stroke or movement of the rear seat when moved from one position to the other, so that the seat may be supported at all times upon the supporting mechanism, and thus held from resting on the body of the vehicle.

The further object of my invention is to provide an adjustable support of novel construction on which the supporting-iron of the rear seat is adapted to rest.

My invention consists in various constructions and combinations of parts, hereinafter described, and pointed out in the claims.

Figure 1:
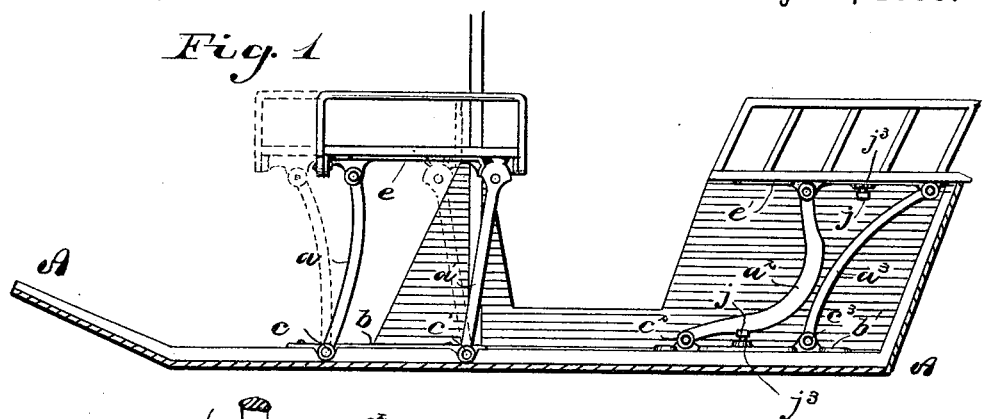
Figure 2:
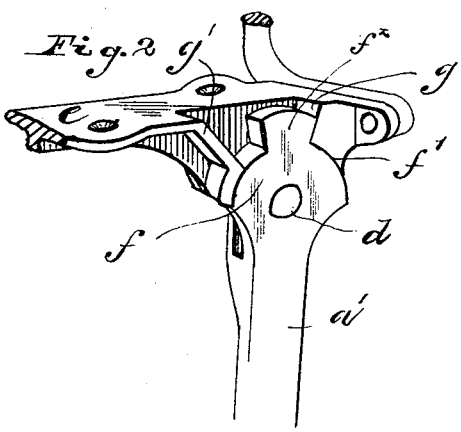
Figure 3:
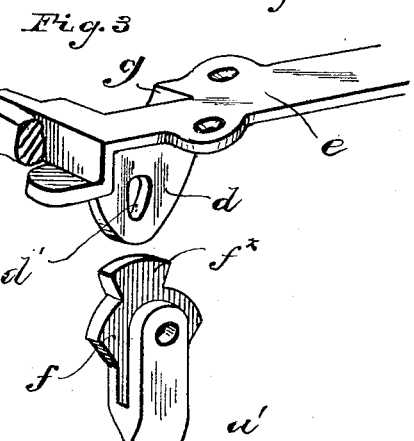
Figure 4:
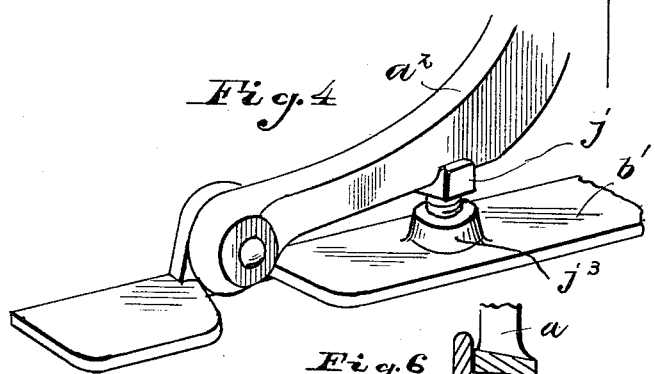
Figure 5:
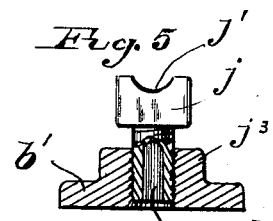
Figure 6:
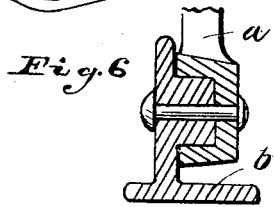

In the accompanying drawings, which form a part of this specification, Figure 1 is a longitudinal sectional elevational view of a portion of a vehicle to which my invention has been applied. Figs. 2 and 3 are respectively perspective views of the locking mechanism of the front seat, which permits of a forward and backward movement thereof, Fig. 2 being a front view with the parts together, and Fig. 3 being a rear view showing the parts detached. Fig. 4 is a perspective view in detail of the adjustable support for the rear seat-shifting device. Fig. 5 is a detail view in section of said support. Fig. 6 is a sectional view of one of the ends of the pivoted arms which support the respective seats, showing the manner of forming the pivoted connection between the said arm and the seat or rocker plates. Fig. 7 is a longitudinal sectional elevational view showing the vehicle arranged as one seated, and showing the forward seat in different position in dotted lines. Figs. 8, 9, 10, 11, and 12 are detail views of modified forms of the locking devices adapted to permit the backward and forward movement of the front seat, referred to hereinafter.

Like parts are indicated by similar letters of reference throughout the several views.

In said drawings, A A represent the bed or body of a vehicle of ordinary construction.

B B' are the front and rear seats, respectively, of said vehicle. The seats B and B' are supported on the rocker-arms $a\ a'\ a^2\ a^3$, which are hinged at the bottom to the rocker-plates $b$ and $b'$ at the points $c\ c'$ and $c^2\ c^3$, in the manner substantially as set forth in my former patents before named, or in any other suitable or well-known manner. The upper ends of the rocker-arms $a$ and $a'$ are hinged or pivoted to the seat B in such a manner that the seat may be turned to the position shown in Fig. 1, or in the position shown in full and dotted lines, respectively, in Fig. 7, in the customary manner. The upper ends of the rocker-arms $a^2$ and $a^3$ are hinged or pivoted to the rear seat, B', in such a manner that the seat may be turned to occupy a forward or backward position, as shown, respectively, in Figs. 7 and 1, in a well-known manner.

When the seats are both turned into position for use, forming a two-seated vehicle, it is frequently desirable, in order that the passengers may have free access thereto, that the front seat be moved forwardly to a limited extent, in order that the distance between the seats may be increased to permit the occupants free ingress and egress. This I accomplish by providing a lock of novel construction adapted to hold the seat in its normal position for use and at the same time permit a limited movement in a forward direction. This lock I construct as follows: The upper arm of the rocker arm or leg $a'$ is bifurcated and projects forward on either side of a lug, $d$, on the seat-plate $e$, to which the seat B is secured. The lug $d$ is provided with an elongated opening, $d'$, through which a rivet, $d^2$, passes, the said rivet $d^2$ being also adapted to pass through the bifurcated end of the rocker arm or leg $a'$, and thus connect the same to the seat-plate $e$. One end of the rocker-arm $a$ is provided with an enlarged portion, $f$, which is formed in the arc of a circle and adapted to rest in a seat or bearing, $f$. The enlarged portion of the leg is provided with an upwardly-extending stop, $f^2$, provided on either side with bearing-faces adapted to come in contact with the stops or shoulders $g\ g'$ on the seat-plate $e$.

It will be seen, now, that by reason of the elongated opening $d'$ the seat-plate $e$ may be lifted, so as to withdraw the stop projection $f^2$ from the line of the respective faces $g\ g'$, and thus allow the seat B to turn forward or backward for the purpose of folding, as indicated in Fig. 7. The stop projection $f$, however, is smaller than the space between the stops $g\ g'$, respectively, so that a limited movement of the seat is permitted backward or forward sufficient to bring the stop projection $f^2$ in contact with the respective faces $g\ g'$ without withdrawing the said projection $f$ from the line of the stops $g\ g'$. When the seat B is in its normal position for use, the stop projection $f^2$ rests against the stop $g$, the upper ends of the respective rocker arms or legs $a\ a'$ being slightly back of their lower pivotal point, and any weight on the seat will tend to hold the said stops in this position.

By removing the weight and drawing the seat slightly forward until the upper pivotal point passes forward of the lower pivotal point, the stop projection $f^2$ is brought in contact with the other stop, $g$, and any weight on the seat tends to hold it in this position. By raising the rear portion of the seat until the stop projection $f^2$ is withdrawn from the line of the respective stops $g\ g'$, the said seat may be turned in either direction and to either position of adjustment shown in Fig. 7. By this construction it will be seen that the driver or occupants of the front seat may at will shift the seat forward or back to a limited extent, so that the distance between the respective seats may be increased or diminished to permit the ingress or egress of the occupants of the rear seat, the stop projection being adapted to limit the movement of the seat in either direction and form a positive stop therefor.

It is obvious that the stops adapted to hold the seat in this limited forward or backward movement may be differently located to accommodate locks of different construction and at the same time accomplish the desired result. In Figs. 8 to 12, inclusive, I have shown the stops used in connection with locks of different construction. In this case the rocker arms or legs are pivoted directly to the plate on the seat B without any lateral movement with reference thereto.

The stop projection $f^2$ is formed on one or both of the legs $a\ a'$, as shown in Figs. 8 to 10, respectively. The stops $g\ g'$ respectively are formed on an arm, $h$, projected downwardly from the seat-arm $h'$, which is pivoted to the seat-plate $e$, and adapted to fold, as indicated in dotted lines, Figs. 9 and 11, so as to withdraw the arm $h$ from the line of the stop projection or projections $f^2$, and thus permit the seat to be folded in either direction in the ordinary manner.

When the seat is in position for use, the seat-arm is raised to its normal position, and this locks said seat in position by bringing the stop faces $g\ g'$ into line with the stop projection or projections $f^2$, while at the same time a limited movement of the seat forward or backward is permitted without moving said seat-arm or unlocking the seat.

It is obvious that other modifications in this device may be employed, if desired—for instance, as shown in Fig. 12, in which case the stop-faces $g\ g'$ are formed in the nature of hooks on the inner face of the arm $h$, and adapted to engage directly with the leg or legs, respectively.

The rocker arms or legs $a^2\ a^3$ of the rear seat are connected in the usual manner to the rocker-plate $b'$ and the seat-plate $e'$. The rocker arm or leg is curved so as to have a bearing against the rocker-plate $b'$ or the seat-plate $e'$ when in either position.

It frequently happens in constructing a vehicle of this kind that the rear seat is projected beyond the sides or rear of the body of said vehicle, or the sides of the body do not exactly correspond in length or height with the legs, so that the seat, when turned to either position of adjustment, rests directly against the body of the vehicle, which is very objectionable. In order to obviate this difficulty and to provide a shifting mechanism adapted to the varying vehicle-bodies, I provide an adjustable support, $j$, in the rocker-plate $b'$ and the seat-plate $e$, respectively, against which the rocker-arm $a^2$ is adapted to rest when turned to either position of adjustment. This adjustable support consists of a set-screw, $j$, provided at the top with a concave bearing, $j'$, for the rocker-arm, and provided at the lower end with a cup-shaped opening, $j^2$, projecting some distance therein. The set-screw $j$ is adapted to screw into a boss or projection, $j^3$, on the seat-plate $b'$, which is tapped out to receive the same.

In placing the seat-supporting device into position the respective set-screws $j$ are turned until they bear proper relation to the rocker-arm $a^2$ to support the seat at the proper height in either position of adjustment, after which the lower portion of the set-screw is expanded by driving a punch or drift into the cup-shaped opening in the bottom thereof. By this construction it will be seen that the rear seat-supporting device may be adjusted as desired and the adjustable supports held in any position of adjustment.

It will be seen that the shifting devices, as thus described, are simple in construction and operation, are readily adjustable, and adapted to perform their function with ease and precision.

The bearings for the rocker arm or legs are preferably formed as shown in Fig. 6, so that the rivets which form the pivotal connection are relieved from all strain or wear thereon.

Having thus described my invention, I claim—

1. The combination, in a shifting seat for vehicles, of pivoted rocker arms or legs adapted to support the seat in position for use and permit the same to be turned or folded when not in use, a locking device for holding said seat in its normal position, said locking device being provided with stops adapted to permit a limited movement of said seat and form a positive stop therefor in either direction, disengaging said locking device, substantially as set forth.

2. In a shifting seat for vehicles, the combination of rocker and seat plates having rocker arms or legs pivotally secured thereto at either end, a stop projection on one of said legs, and a locking device provided with stop-faces adapted to come against said stop projection when the seat is turned to a certain extent in either direction, said locking device being adapted to withdraw the stop projection from the line of said stop-faces to permit the seat to be folded in either direction, substantially as set forth.

3. The combination, with the front seat-plate having rocker-arms secured thereto, of a lug on said seat-plate, to which one of the said arms is attached, an elongated opening in said lug, through which a pivotal connection is adapted to pass, stop projection on said rocker-arm, and stop on said seat-plate, said stops being separated from each other by a space larger than the stop projection, which is adapted to come in contact with the respective stops, substantially as and for the purpose set forth.

4. The combination, with the front seat-plate having a concave bearing, and the rocker arm or leg having an enlarged end adapted to fit in said concave bearing, of a stop projection adapted to project upwardly between the stop-faces on said seat-plate and adapted to come in contact with said stop-faces when turned to different positions of adjustment, the said arm or leg secured to the seat-plate by means which will permit the stop projection to be withdrawn from the line of said stop-faces, substantially as set forth.

5. In a shifting seat for vehicles, the combination, with the front seat-plate and the rocker arms or legs pivotally secured thereto, of a concave bearing on said seat-plate, stop-faces above said concave bearing, and a connecting-lug provided with an elongated hole therein, one of the said rocker arms or legs being bifurcated at the upper end and provided with an enlarged portion adapted to fit in said concave bearing, and having a stop projection extending upwardly in a line with said stop-faces, a pin or rivet passing through said bifurcated arms or legs, and an elongated opening in said connecting-lug, substantially as and for the purpose set forth.

6. In a shifting seat for vehicles, the combination, with the rear seat, of rocker arms or legs pivoted at either end to said seat and to a rocker-plate at the bottom of said vehicle, respectively, one of said legs being curved to bear against said rocker-plate and seat-plate, respectively, when turned to a different position of adjustment, an adjustable screw provided with a concave bearing in said rocker-plate and seat-plate, respectively adapted to form a support for said rocker-arm when turned to either position of adjustment, substantially as set forth.

7. The combination of the rear seat, the seat-plate therefor, the rocker-plate under said seat, pivoted lugs connected, respectively, to said rocker-plate and seat-plate, and a set-screw in said rocker-plate and seat-plate, respectively adapted to form a bearing for the rocker-arm when turned to either position of adjustment, said screw being provided with a cup-shaped opening adapted to be spread or expanded to prevent the same from turning, substantially as set forth.

In testimony whereof I have hereunto set my hand this 14th day of November, A. D. 1887.

CHARLES C. ADELSPERGER.

Witnesses:
FRANK RIGHTMYER,
PAUL A. STALEY.